United States Patent [19]

Stevenson

[11] Patent Number: 4,539,877
[45] Date of Patent: Sep. 10, 1985

[54] SAWMILL

[76] Inventor: Robert L. Stevenson, P.O. Box 370, Rogue River, Oreg. 97537

[21] Appl. No.: 462,331

[22] Filed: Jan. 31, 1983

[51] Int. Cl.³ ............................................. B27B 7/00
[52] U.S. Cl. .................................... 83/731; 83/707; 83/435.1; 83/155; 144/252 R
[58] Field of Search ...................... 83/435.1, 707, 731, 83/155; 144/252 R

[56] References Cited

U.S. PATENT DOCUMENTS

| | | | |
|---|---|---|---|
| 922,840 | 5/1909 | Bemiller | 144/252 R |
| 2,419,751 | 4/1947 | Wilson et al. | 144/252 R X |
| 2,574,974 | 11/1951 | Johnson | 144/252 R X |
| 2,778,392 | 1/1957 | Peterson | 83/435.1 X |
| 3,398,771 | 8/1968 | May | |
| 3,548,896 | 11/1970 | Larsen et al. | |
| 3,913,439 | 10/1975 | Large | 83/707 |
| 4,331,052 | 5/1982 | Neff | 83/435.1 X |

OTHER PUBLICATIONS

Brochure of Mighty Mite Sawmills H Series.
Brochure of G. W. Ecologizer.
Brochure of the Wick Transportable Sawmill.
Brochure of Mobile Dimension Saw.
Brochure of Utilizer Sawmills.
Brochure of Frick Portable Sawmills.

Primary Examiner—Donald R. Schran
Attorney, Agent, or Firm—Eugene M. Eckelman

[57] ABSTRACT

An elongated frame supports a pair of rails for a wheeled log carriage. A winch drum is mounted on the frame between the ends of the latter and drives a cable reeved through opposite end pulleys for moving the carriage in feed and return movements. Multiple pulley V-belt assemblies are provided in the drive unit for the carriage and are operated by a manual lever which in one direction actuates feed movement of the carriage and releases return drive movement and in the other direction of the lever releases the drive for the feed movement and actuates the drive for the return movement. Such actuation and release of the multiple pulley V-belt assemblies is controlled by rocker arm clutches controlled by the manual lever. A log ramp is utilized with the mechanism and has a pull cable powered from the main drive mechanism of the sawmill under control of an operator's lever. A sawdust pickup housing is combined with the saw blade to catch sawdust and a conveyor associated with the pickup housing and driven from the main power drive of the saw delivers the sawdust to the opposite side of the machine for loading into a vehicle.

5 Claims, 5 Drawing Figures

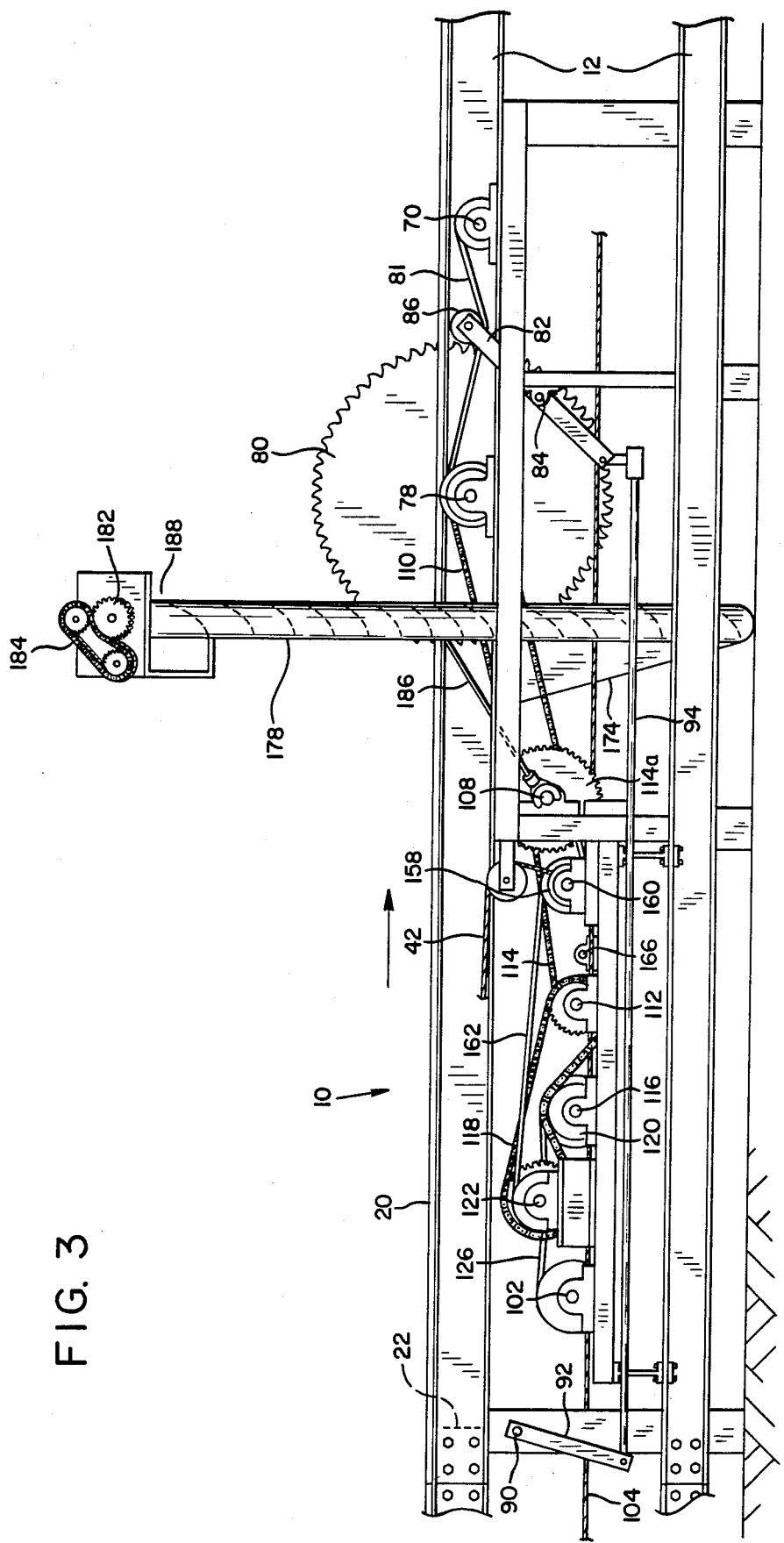

SAWMILL

BACKGROUND OF THE INVENTION

This invention relates to new and useful improvements in sawmills.

Various types of sawmills have heretofore been provided. These sawmills range from the extremely large mill to a portable type mill that can be trucked to the site and set up as a one man or two-man operation. The large mill is of course not portable to the extent that it can be set up in a short time and in a small space. The small portable mills, while being of smaller size and operable by one or two persons, have the disadvantage that they are limited in their functions because they clamp to the log and thus can only work on the larger type log. Portable mills have also been provided which accommodate the smaller type log. A void exists in the trade, however, for processing the intermediate type log by means of a portable or semi-portable type mill, namely, a mill capable of processing logs up to about two feet in diameter. This latter type of mill must have sufficient versatility to handle the logs as well as to provide effective control for the sawing operation under available power conditions. To applicant's knowledge, mills having structure to meet these requirements have not had commercial success.

SUMMARY OF THE INVENTION

According to the present invention and forming a primary objective thereof, a sawmill is provided which is of medium size and maintains the advantages of a larger type sawmill in that it can handle relatively large logs and have a good production output but also have the advantages of a small sawmill in that it can be set up and dismantled by one or two persons, it takes up a relatively small space, and is inexpensive to manufacture.

Another object of the present invention is to provide a sawmill having a novel drive mechanism for the saw and carriage in that such mechanism is compact in structure and efficient in operation and which can be driven from the power output of a conventional tractor if desired.

Still another object of the invention is to provide a sawmill having a power system with novel controls facilitating controlled operation of the carriage to accommodate different sawing requirements as well as power that may be available.

Still another object is to provide a sawmill employing a novel sawdust pickup structure for conveying sawdust away from the saw and loading it in a vehicle.

Yet another object is to provide a sawmill which employs a novel log loading ramp powered by the same drive mechanism that powers the saw.

In carrying out the objectives of the invention, the present sawmill employs an elongated frame which supports a movable carriage. Such frame is provided in sections for convenient transportation in setting it up, and for disassembling it. The carriage is operated in feed and return directions by a winch drum and cable in a drive system employing forward and reverse multiple belt V-belt assemblies driven by a powered input, such input also driving the saw blade. A manually operating lever arrangement at an operator's station is provided for operating the V-belt assemblies such that the carriage is driven in its feed movement by one movement of the lever and in its return by the other movement of the same lever. A main drive lever is provided for on and off control of the main power input and a braking control of the saw blade shaft, such lever also being located at the operator's station. A third lever is provided at the operator's station and controls the operation of a winch drum and line assembly for moving logs up a ramp connected to the main frame of the mill adjacent the operator's station. Sawdust conveying means are connected to the frame and lead from a sawdust collection housing at the saw to a side of the mill for deposit in a vehicle.

The invention will be better understood and additional objects and advantages will become apparent from the following description taken in connection with the accompanying drawings.

BRIEF DESCRIPTION OF THE DRAWINGS

FIG. 3 is a fragmentary side elevational view taken on the line 3—3 of FIG. 1B.

DETAILED DESCRIPTION OF A PREFERRED EMBODIMENT

Figure 2:
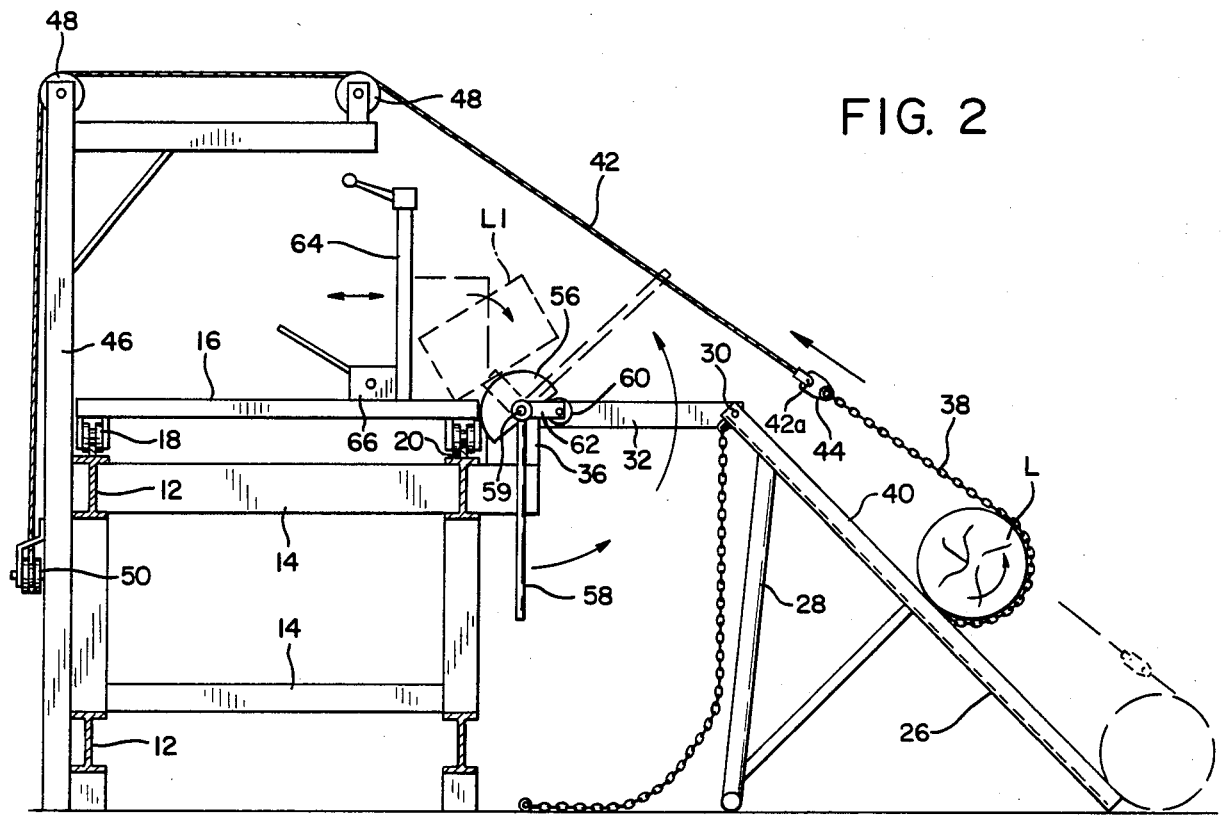
FIG. 2 is a cross sectional view taken on the line 2—2 of FIG. 1A.

The sawmill of the invention comprises an elongated frame 10 having longitudinal upper and lower frame members 12 interconnected by transverse frame members 14. The upper frame members 12 form support rails for a carriage 16 with wheels 18 operating on the rails 12. Wheels 18 are grooved and have guided movement on peaked projections 20 integral with the rails 12. Frame 10 is provided in sections so as to be readily transportable and readily set up and dismantled by one or two persons. It may be provided in any number of sections but for purpose of illustration, the frame has three sections 10a, FIG. 1A and 1B, and sections 10b and 10c, FIG. 1B. The sections are held together by connecting plates 22 bolted to adjacent ends of the frame members.

Adjacent the feed end of the frame 10 is a log ramp 26 resting at its outer end on the ground and supported by inwardly disposed legs 28. The upper or inner end of the ramp has a tubular cross bar 30 supporting one end of a horizontal ramp extension 32. The other end of the extension has an integral cross tube 34 secured on the frame 10.

Figure 1A:
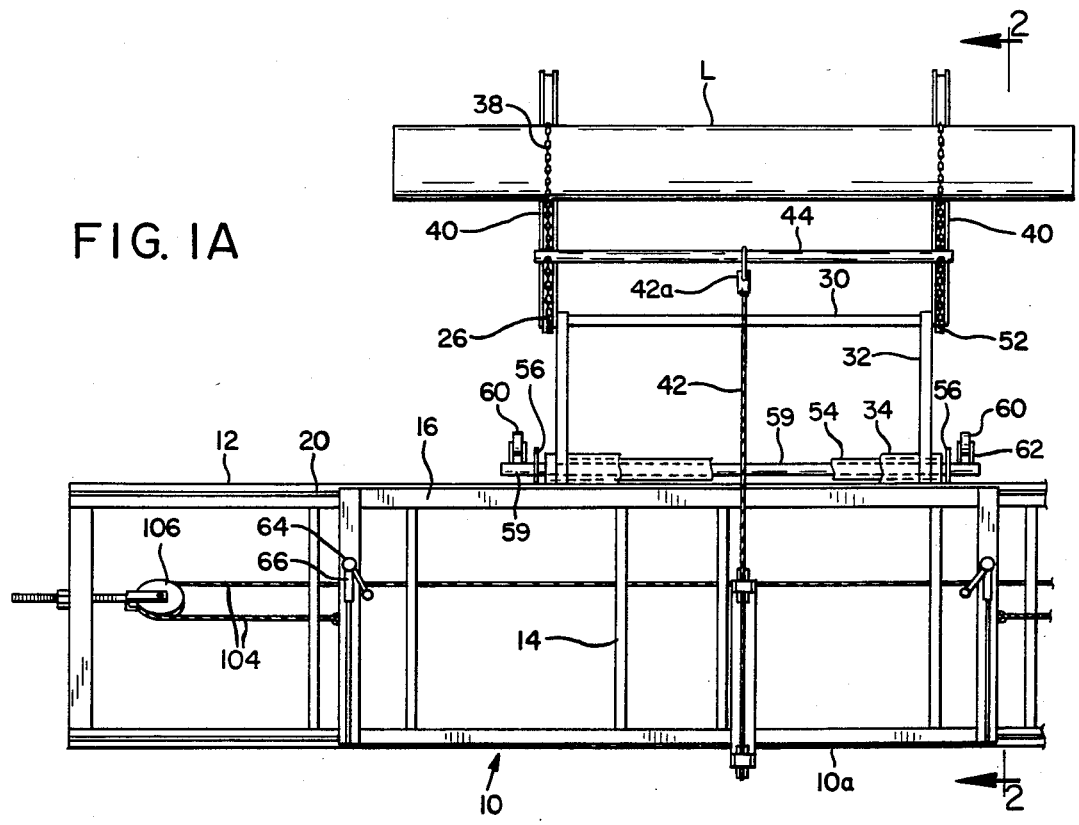
FIGS. 1A and 1B are composite plan views showing, from left to right, the full length of the sawmill.

The top surface of horizontal ramp extension 32 is in the same plane as the top surface of the carriage 16. Logs L are arranged to be moved up the ramp and onto the extension 32 by means of sling chains 38. These chains operate in upwardly opening side channel members 40 of the ramp 26 and have one of their ends connected to a central pull cable 42 connected to a cross bar 44 by means of releasable hook means 42a. Bar 44 is connected to one end of the chains 38, and these chains are arranged to loop over a log and then up the channel-shaped side members 40, as seen in FIGS. 1A and 2. Pull cable 42 operates over an overhead frame 46 having guide sheaves 48 at the top for the cable and also a guide sheave 50 at a lower point on the extension on the opposite side of the frame 10 from the log ramp. Cable 42 leads from the sheave 50 to a drive mechanism of the sawmill to be described hereinafter.

Log engaging chains 38 have detachable connection to slotted ends 52 at the top of the side channels 40 of the ramp 26. The slotted ends 52 provide an adjustable connection of selected links of the chain for adjusting the length thereof. For moving a log up the ramp, the bar 44 is disconnected from the cable 42 by means of releasable hook 42a and this bar and chains are laid flat on the ground. A log is rolled over the bar onto the chains and the bar then connected to cable 42. The chains are connected to the slotted ends 52 at the proper length, and the cable 42, by suitable drive movement, can pull the logs up the ramp and onto the ramp extension 32.

Tubular member 34 supports a tubular shaft 54 therein to which opposite end half circular discs 56 are secured, the shaft 54 having a friction fit in the tubular member 34 such that it can be rotatably turned by hand but will remain in the position to which it is adjusted for selectively positioning the discs 56. A hand lever 58 is provided on one end of a shaft 59 rotatably supported in the tubular shaft 54. Shaft 59 has opposite end rollers 60 mounted on the outer ends of bifurcated lever arms 62, and the lever 58 can be operated to work these levers for positioning a log, as will now be more apparent. Lever 58 is adjacent the operator's station of the mill.

With reference to FIG. 2, when a log is to be loaded, the discs 56 are turned so that their straight edge is up, whereby the logs can be rolled over them directly onto the carriage. The final short distance of movement of the log into the carriage is accomplished, if necessary, by the rollers 60 operated by the hand levers 58. If it is desired that a partially sawed log L1 be turned, the discs 56 are rotated with their arcuate side up and the log tipped into engagement with them. Thereupon, the levers 58 can be used to reposition the partially sawed log L1 for further sawing.

Carriage 16 supports suitable log abutment means 64 at its ends having lateral adjustable support on the carriage by releasable adjusting means 66 of conventional structure.

Figure 4:
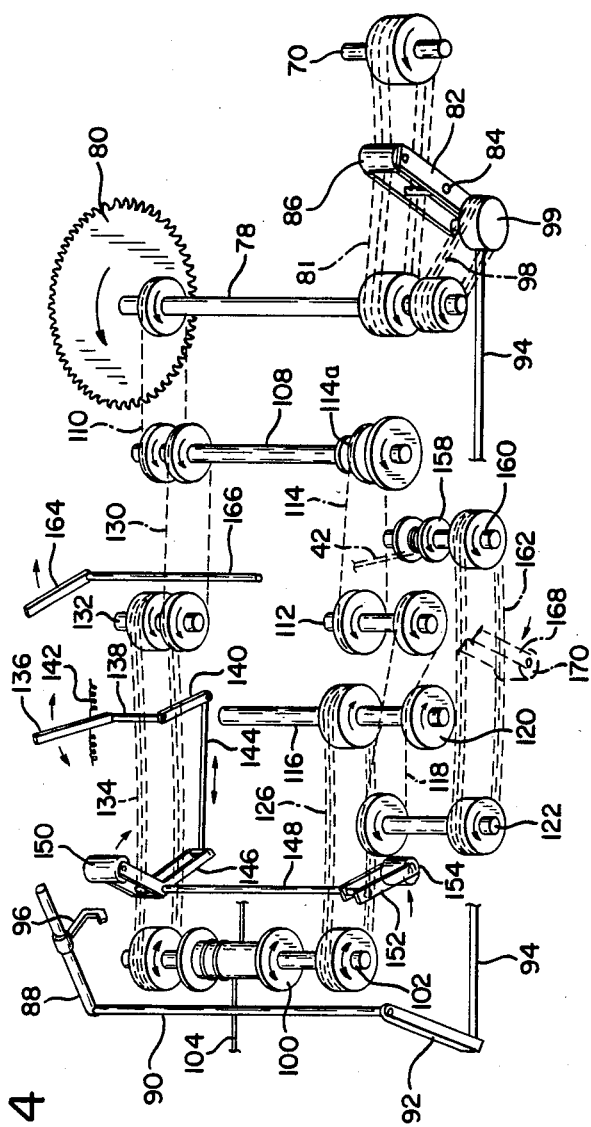
FIG. 4 is a diagrammatic view of drive and control structure of the sawmill.
Figure 1B:
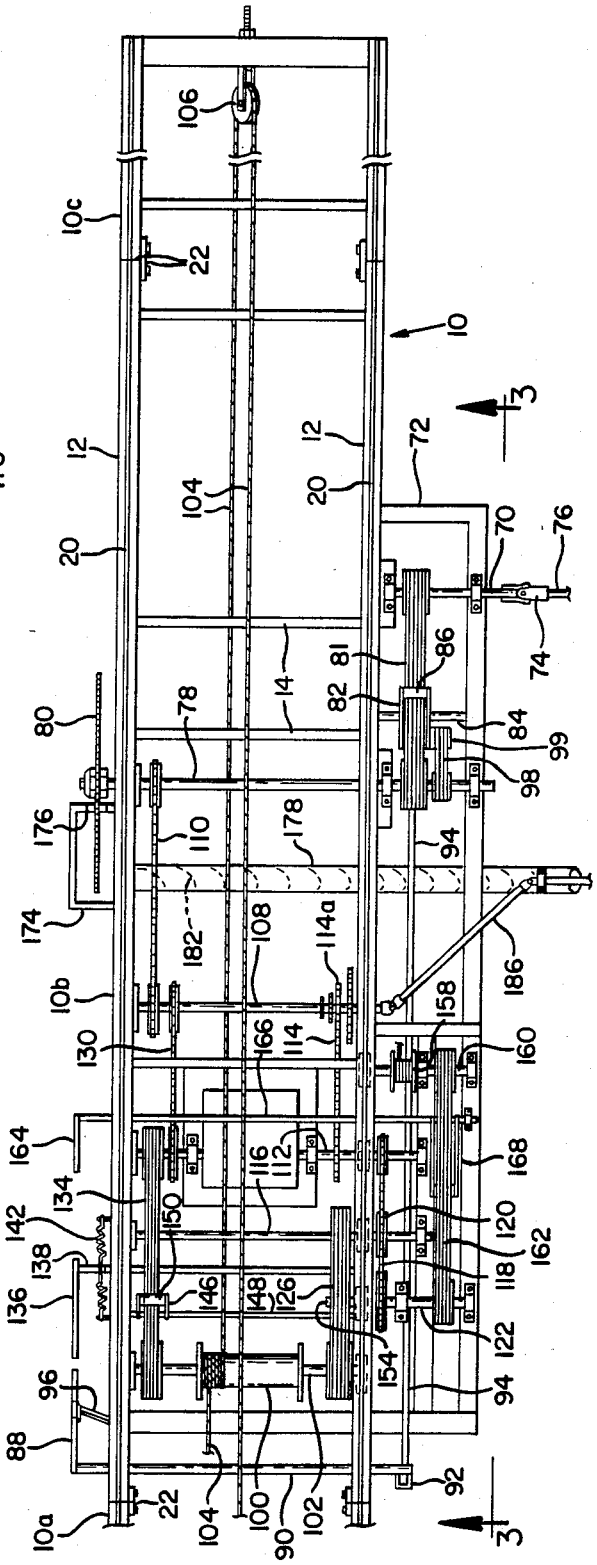

An input shaft 70, FIGS. 1B, 3 and 4, leads into the frame 10 from the side opposite the log ramp and has journaled support on the frame 10 and a frame extension 72. Shaft 70 has a universal connection 74 with a shaft 76 which leads to a power source, not shown. Such power source may comprise a power unit forming a part of the sawmill or it can be connected to the output of a conventional tractor. Shaft 70 drives a saw shaft 78 and saw blade 80 on the latter through the medium of a multiple pulley and V-belt assembly 81 operating in a counterclockwise direction, FIG. 4. The V-belt assembly 81 is such that normally the belts slip on the pulleys and a controlled drive connection therefor is accomplished by a rocker arm clutch 82 having a pivot support 84 between its ends on the frame. Rocker arm clutch 82 has an end roller 86 which in a vertical position of the rocker arm is out of engagement with the belts of the V-belt assembly 80 but when the clutch is pivoted clockwise, FIG. 4, such roller engages the belts and pulls them down into a drive engagement on the pulleys. Rocker arm clutch 82 is operated by a hand lever 88 on the saw blade side of the machine at the operator's station and supported integrally on a cross rod 90 having journaled support in the frame 10. Cross rod 90 has an integral lever end 92 disposed substantially in longitudinal alignment with the rocker arm clutch 82 and connected to the bottom end of the rocker arm clutch by a link 94. By rotative movement of the lever 88 to the left as viewed in FIG. 4, the clutch 82 is rotated in the same direction whereby to allow the pulleys to slip and disengage the input shaft 70 from the saw shaft 78. Operation of the lever 88 in the opposite direction rotates the clutch 82 so that the roller 86 pulls the belts down into driving engagement for operation of the saw shaft. Lever 88 has a hook 96 thereon engaged to hook under a frame member 12 for holding the lever down in a drive position. In a preferred arrangement, the lever 88 must be sprung inward to engage the hook 96 under a frame member and thus it can be quickly disengaged by a downward force, such as kicking it with the foot.

Rocker arm clutch 82 also has a V-belt assembly 98 with the saw shaft 78. This V-belt assembly is engaged with the lower end of the clutch 82, and such engagement is with a non-rotatable pulley 99 which is capable of serving as a brake. That is, the belts 98 will slip on non-rotatable pulley 99 when the clutch 82 engages belts 81 for driving the shaft 78 but will tighten on the pulley 99 to brake the shaft 78 when the clutch is released. Thus, the saw is stopped immediately upon release of lever 88.

The carriage drive assembly of the mechanism comprises a winch drum 100 secured on a cross shaft 102 journaled in the frame 10. A carriage drive cable 104 is reeved on the drum 100 with the opposite ends extending in opposite directions and leading over end sheaves 106 secured to each end of the frame 10. Opposite ends of the cable 106 are secured to opposite ends of the carriage in an arrangement such that clockwise rotation of the drum moves the carriage in a feed operation toward the saw blade and counterclockwise direction returns the carriage.

A secondary drive shaft 108 is journaled in the frame 10 adjacent to the saw shaft 78 and is driven by a chain and sprocket assembly 110 connected between these two shafts. In the feed drive of the carriage, secondary shaft 108 drives a stub shaft 112 journaled in the frame, such drive connection being by means of a chain and sprocket wheel assembly 114. This assembly has a change speed sprocket 114a on the shaft 108. A shaft 116 journaled in the frame 10 is driven by shaft 112 in the opposite direction as the latter by a chain and sprocket wheel assembly 118 operating over a reversing sprocket wheel 120. The opposite end of the chain and sprocket wheel assembly 118 is supported on a stub shaft 122 suitably journaled in the frame 10. Shaft 116 has a drive connection with the winch drum shaft 102 by means of a multiple pulley and V-belt assembly 126.

Return drive of the carriage comprises a chain and sprocket wheel assembly 130 connecting shaft 108 to a stub shaft 132 journaled in the frame 10. Stub shaft 132 is connected to winch drum shaft 102 by means of a multiple drum and V-belt assembly 134.

The V-belt assembles 126 and 134 are arranged normally to have slippage on their pulleys, and selective operation of these V-belt assemblies is controlled by a manually operating lever 136 at the operator's station secured to a short transverse shaft 138 journaled in the frame 10 and having an integral depending lever 140 on its inner end. Lever 136 is normally held in a vertical upright neutral position by return springs 142. The free end of lever 140 is connected, by means of a rod 144 to the lower end of a rocker arm clutch 146 secured on a cross shaft 148 journaled in the frame 10. Clutch 146 has a top end roller 150 which upon clockwise movement, FIG. 4, of the clutch engages the belts and tightens them to establish a drive connection between the shafts 102 and 132. A lever arm clutch 152 is secured to the opposite end of shaft 148 and carries an end roller 154 arranged upon rotation of the shaft 148 in a counterclockwise direction, FIG. 4, to engage the belts of V-belt assembly 126 from the bottom and establish a clockwise rotation of the winch drum shaft 102.

In the arrangement shown and described, when the lever 136 is pulled rearwardly or in other words away from the saw, the roller 150 is released from the V-belt assembly 134 to allow slippage of this V-belt assembly. This same rotation of the lever 136 rotates the lever 152 to cause engagement of the roller 154 with the V-belt assembly 126 and establish clockwise drive of the drum shaft 102 to pull the carriage toward the saw in the feed movement. By rotating the lever 136 to the right as viewed in FIG. 4, the V-belt assembly 126 is allowed to slip and the V-belt assembly 134 is actuated for providing a return drive of the carriage. The carriage speed in its feed movement can be adjusted by means of the variable speed sprocket assembly 114a. Such adjustment may be desired to accomplish the most efficient rate of drive speed of the carriage depending upon the amount of power available from the power source and/or the type of logs being sawed. Carriage speed in both directions is also readily controlled by the operator in that by selective movement of the lever 136, direct drive of the belts or a slippage drive can be accomplished.

The log pull cable 42 for the feeding mechanism leads from guide sheave 50 to a drum 158 on a stub shaft 160 journaled in the frame 10 and having a drive connection with the stub shaft 122 by means of a multiple pulley and V-belt assembly 162. A hand operated lever 164 at the operator's station is integral with a cross shaft 166 journaled in the frame 10 and having a lever arm clutch 168 with an end roller 170. Roller 170 is arranged to engage the V-belts of the assembly 162 upon clockwise rotation, FIG. 4, of the hand lever 164. Thus, lever 164 is used to control the operation of the log lift cable 42 for pulling a log up the ramp 26. The cable 42 can be pulled back by hand for engaging the next log.

Saw blade 80 is confined at its lower end in a housing 174, FIGS. 1B and 3. Housing 174 has an open top to receive the saw blade and the front wall has a slot 176 through which the blade projects. The bottom of housing 174 forms a hopper for sawdust, and a transversely extending conveying tube 178 leads from the bottom of housing 174 to a point on the opposite side of the frame. A screw conveyor 180 is enclosed in the conveying tube 178 and is driven by an end gear 182 engaged by a sprocket chain assembly 184 driven by a universal shaft 186 leading in a drive connection from secondary drive shaft 108. Sawdust from the saw blade 80 is conveyed up the tube 178 and deposited out an outlet opening 188 at the top of the tube 178 for loading into a vehicle.

According to the present invention, a medium sized sawmill is provided which includes many of the features of the large sawmills as to efficiency and operation and the handling of assorted size logs. At the same time, the mill can be readily set up and operated by a minimum number of personnel. The apparatus is simple in construction and relatively inexpensive since most parts thereof are readily available. The mill is readily controlled for lifting logs onto the carriage and efficient control of the carriage as to its speed and direction is also available to the operator. The use of V-belt assemblies provides a very compact drive arrangement whereby the drive members can be located within the frame or in close association thereto, such as in the frame extension 72. Such V-belts also provide precise operator control of the carriage since the lever 136 can be moved to control slippage or direct drive. This latter feature is also present for the log pull cable 42 by lever 164. Frame extension 72 can if desired be an independent unit from the main frame 10 whereby such frame and all the drive components thereon can be integrated as a separate unit and transported for connection, as by bolting, into the main frame. Or, if desired only a portion of the drive components may be integrated into a separate unit such as the drum 100 and its drive assemblies 126 and 134 and the log ramp drum 158 and its drive assembly 162.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A sawmill comprising
an elongated frame having ground supporting legs,
a pair of rails on the upper portion of said frame,
a wheeled carriage supported on said rails for carrying a log,
a powered input shaft having journaled support in said frame,
a saw blade shaft journaled in said frame,
drive means connecting said input shaft and said saw blade shaft,
a winch drum mounted on a winch drum shaft supported by said frame between the ends of the latter,
a drive cable wound on said drum,
means connecting the ends of said cable to said carriage,
end sheaves on said frame over which said cable is reeved whereby said carriage is arranged to be driven in forward and rearward movements for feeding a log into said saw,
power transfer means operatively connected between said saw blade shaft and said winch drum shaft,
said power transfer means including a pair of V-belt pulley drives connected between said saw blade shaft and said winch drum shaft with one of said drives providing forward movement of said carriage and the other of said drives providing rearward movement of said carriage,
said power transfer means includes an adjustable speed drive means which can be pre-set for controlling the speed drive from said saw blade shaft to the forward V-belt pulley drive for said carriage,
a manually operable carriage control lever having a neutral position and opposite engaged positions for forward and rearward driving movements of said carriage,
said V-belt pulley drives having slippage in said neutral position of said manually operated lever,
and clutch means on each of said V-belt pulley drives operative to engage one of said drive while disengaging the other and vice versa,
said carriage control lever being manually shiftable to any position which is between said neutral position and its forward engaged position for applying selected clutch engagement of its associated V-belt pulley drive to control the forward speed and driving power of said carriage.

2. The sawmill of claim 1 wherein said power transfer means includes pre-set speed drive means for controlling the speed of drive from said saw blade shaft to the forward V-belt pulley drive for said carriage.

3. The sawmill of claim 1 including an auxiliary frame secured on one side of said elongated frame and including means for providing some of said journaled support for said input shaft and said saw blade shaft and also enclosing a portion of and providing some journaled support of said power transfer means, a second winch drum supported on said auxiliary frame and receiving its driving power from said power transfer means, a log ramp on the opposite side of said frame from said auxiliary frame, an overhead frame secured to said elongated frame, and line means reeved on said overhead frame and extending between said second winch drum and said log ramp for pulling logs up said ramp onto said carriage.

4. The sawmill of claim 1 including a log ramp on one side of said frame, said log ramp having a horizontal portion in the plane of said carriage for moving a log onto said carriage, manually operated lever means movable from below the plane of said horizontal log ramp portion and operable to engage a log for shifting said log, log supporting disc means rotatably supported at said horizontal log ramp portion, said disc means having an arcuate portion arranged in one rotated position of said disc means to extend above the plane of said horizontal log ramp portion to support a log thereon and in another rotated position to be disposed below the plane of said horizontal log ramp portion to allow a log to be moved thereover.

5. The sawmill of claim 1 wherein said drive means connecting said saw blade shaft to said input shaft includes brake means engageable with said shaft and clutch means arranged to operate said drive means, and manually operable lever means connected to said clutch means and said brake means in an arrangement such that when said clutch is disengaged, said brake means stops said saw blade shaft.

* * * * *